(12) United States Patent
Tian et al.

(10) Patent No.: US 11,258,289 B2
(45) Date of Patent: Feb. 22, 2022

(54) POWER SUPPLY CIRCUIT AND ADAPTOR

(71) Applicant: Guangdong Oppo Mobile Telecommunications Corp., Ltd., Guangdong (CN)

(72) Inventors: Chen Tian, Guangdong (CN); Jialiang Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 187 days.

(21) Appl. No.: 16/510,143

(22) Filed: Jul. 12, 2019

(65) Prior Publication Data
US 2019/0334365 A1 Oct. 31, 2019

Related U.S. Application Data

(63) Continuation of application No. PCT/CN2017/103009, filed on Sep. 22, 2017.

(51) Int. Cl.
*H02J 7/02* (2016.01)
*H02J 7/00* (2006.01)
(Continued)

(52) U.S. Cl.
CPC ............... *H02J 7/02* (2013.01); *G05F 1/575* (2013.01); *H02J 7/007* (2013.01);
(Continued)

(58) Field of Classification Search
CPC .... H02J 7/02; H02J 7/00; H02J 7/007; H02M 1/42; H02M 1/4258; H02M 3/33561; H02M 3/33507; H02M 2001/0003; G05F 1/575
(Continued)

(56) References Cited

U.S. PATENT DOCUMENTS 5,847,543 A * 12/1998 Carroll ................. G06F 1/1632
320/125
5,861,730 A * 1/1999 Lee ....................... H02J 7/0071
320/106
(Continued)

FOREIGN PATENT DOCUMENTS

CN 104135043 A 11/2014
CN 106207291 A 12/2016
(Continued)

OTHER PUBLICATIONS

First examination report issued in corresponding IN application No. 201917027452 dated Oct. 19, 2020.
(Continued)

*Primary Examiner* — Richard Isla
*Assistant Examiner* — Dung V Bui
(74) *Attorney, Agent, or Firm* — Young Basile Hanlon & MacFarlane, P.C.

(57) ABSTRACT

A power supply circuit, a power supply apparatus, and a control method are provided. The power supply circuit includes a primary unit, a modulating unit, a transformer, a secondary rectifier-filter unit, a voltage feedback unit, and a control unit. The control unit of the power supply circuit is configured to communicate with a device to-be-charged to adjust output power of the power supply circuit, to make at least one of output voltage and output current of the power supply circuit match a present charging stage of a battery of the device to-be-charged, and control the output voltage thereof within a first voltage range or a second voltage range.

20 Claims, 8 Drawing Sheets

(51) Int. Cl.
 *H02M 1/42* (2007.01)
 *H02M 3/335* (2006.01)
 *G05F 1/575* (2006.01)
 *H02M 1/00* (2006.01)

(52) U.S. Cl.
 CPC ..... *H02M 1/4258* (2013.01); *H02M 3/33507* (2013.01); *H02M 3/33561* (2013.01); *H02M 1/0003* (2021.05)

(58) Field of Classification Search
 USPC .......................................................... 320/107
 See application file for complete search history.

(56) References Cited

U.S. PATENT DOCUMENTS

| | | | | |
|---|---|---|---|---|
| 5,999,433 | A * | 12/1999 | Hua | H02M 3/337 363/132 |
| 6,295,217 | B1 | 9/2001 | Yang et al. | |
| 2005/0024896 | A1* | 2/2005 | Man-Ho | H02M 3/33592 363/21.04 |
| 2007/0075685 | A1* | 4/2007 | Aradachi | H02J 7/02 320/128 |
| 2008/0266910 | A1* | 10/2008 | Kim | H02M 3/33507 363/21.14 |
| 2009/0016086 | A1* | 1/2009 | Huynh | H02M 3/33523 363/80 |
| 2010/0039836 | A1* | 2/2010 | Gong | H02M 3/33507 363/21.13 |
| 2012/0134707 | A1* | 5/2012 | Inukai | H02M 1/32 399/88 |
| 2013/0215651 | A1* | 8/2013 | Liao | H02M 5/40 363/34 |
| 2014/0254215 | A1* | 9/2014 | Brinlee | H02M 3/33507 363/21.15 |
| 2014/0361733 | A1 | 12/2014 | Zhu et al. | |
| 2014/0372776 | A1* | 12/2014 | Yang | G06F 1/26 713/300 |
| 2017/0099011 | A1* | 4/2017 | Freeman | H02M 1/44 |
| 2017/0229877 | A1 | 8/2017 | Zhang | |
| 2017/0244332 | A1* | 8/2017 | Leong | H02M 3/33523 |

FOREIGN PATENT DOCUMENTS

| | | |
|---|---|---|
| CN | 107124012 A | 9/2017 |
| EP | 2892138 A1 | 7/2015 |
| JP | H10056744 A | 2/1998 |
| JP | 2010051128 A | 3/2010 |
| JP | 2010057247 A | 3/2010 |
| JP | 2015180179 A | 10/2015 |
| WO | 2017133386 A2 | 8/2017 |

OTHER PUBLICATIONS

International search report issued in corresponding international application No. PCT/CN2017/103009 dated Jan. 19, 2018.
Communication pursuant to Article 94(3) EPC issued in corresponding European application No. 17925721.7 dated Jul. 8, 2020.
Extended European search report issued in corresponding European application No. 17925721.7 dated Dec. 13, 2019.
Korean Office Action with English Translation for KR Application 20207001139 dated Jun. 22, 2021. (9 pages).
Japanese Office Action with English Translation for JP Application 2020-500866 dated Jan. 12, 2021 (8 pages).

* cited by examiner

POWER SUPPLY CIRCUIT AND ADAPTOR

CROSS-REFERENCE TO RELATED APPLICATION(S)

This application is a continuation of International Application No. PCT/CN2017/103009, filed on Sep. 22, 2017, the disclosure of which is hereby incorporated by reference in its entirety.

TECHNICAL FIELD

This disclosure relates to the field of charging, and more particularly to a power supply circuit, a power supply apparatus, and a control method.

BACKGROUND

A power supply circuit can be configured to charge a battery of a device to-be-charged. A charging process of the battery generally includes multiple charging stages, and different charging stages have different requirements on charging voltage and/or charging current.

In the related art, an output voltage of the power supply circuit is constant. In order to satisfy requirements on charging voltage and/or charging current of the battery in different charging stages, the device to-be-charged is provided with a conversion circuit, which can convert the output voltage and/or output current of the power supply circuit into expected charging voltage and/or charging current of a present charging stage of the battery.

Provision of the conversion circuit in the device to-be-charged will lead to serious heating of the device to-be-charged.

SUMMARY

A power supply circuit, a power supply apparatus, and a control method are provided in the present disclosure, which can reduce heating of a device to-be-charged during charging.

In a first aspect of the present disclosure, a power supply circuit is provided. The power supply circuit includes a primary unit, a modulating unit, a transformer, a secondary rectifier-filter unit, a voltage feedback unit, and a control unit. The primary unit is configured to generate a first voltage to-be-modulated according to alternating current (AC) input. The modulating unit is configured to modulate the first voltage to generate a second voltage. The transformer is configured to generate a third voltage according to the second voltage. The secondary rectifier-filter unit is configured to generate an output voltage of the power supply circuit by rectifying and filtering the third voltage. The voltage feedback unit is configured to receive the output voltage, and to send a feedback signal to the modulating unit when magnitude of the output voltage reaches a preset value. The modulating unit is configured to modulate the first voltage to generate the second voltage according to the feedback signal. The control unit is configured to communicate with a device to-be-charged to adjust output power of the power supply circuit, to make at least one of the output voltage and output current of the power supply circuit match a present charging stage of a battery of the device to-be-charged.

In a second aspect of the present disclosure, an adaptor is provided. The adaptor includes a primary unit, a modulating unit, a transformer, a secondary rectifier-filter unit, a voltage feedback unit, a switch unit, and a control unit. The primary unit is configured to generate a first voltage to-be-modulated according to alternating current (AC) input. The modulating unit is configured to modulate the first voltage to generate a second voltage. The transformer is configured to generate a third voltage according to the second voltage. The secondary rectifier-filter unit is configured to generate an output voltage of the power supply circuit by rectifying and filtering the third voltage. The voltage feedback unit includes a first voltage feedback unit and a second voltage feedback unit. The first voltage feedback unit is configured to limit the output voltage to a first voltage range together with the modulating unit. The second voltage feedback unit is configured to limit the output voltage to a second voltage range together with the modulating unit. The second voltage range is different from the first voltage range.

DETAILED DESCRIPTION

Figure 1A:
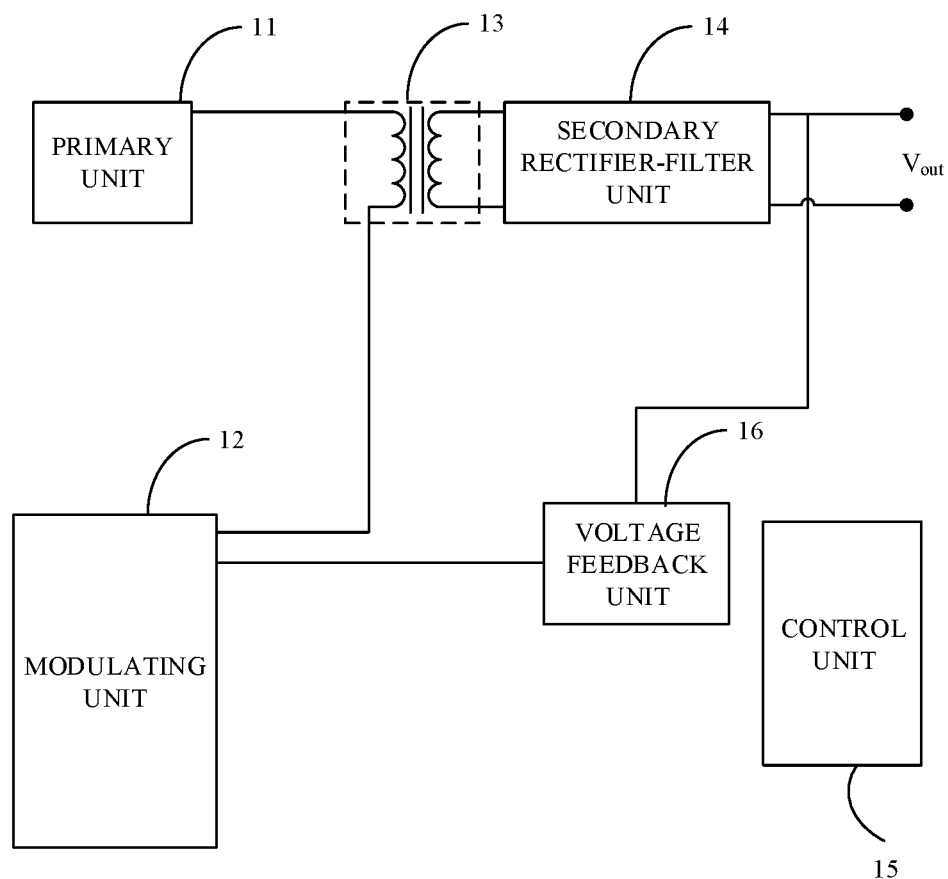
FIG. 1A is a schematic structural diagram illustrating a power supply circuit according to an implementation of the present disclosure.

In implementations of the present disclosure, the "device to-be-charged" can be a terminal device, such as a "communication terminal" (or "terminal" for short), and includes but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone capability such as a conventional laptop or a handheld receiver.

A power supply circuit configured to charge the device to-be-charged has been proposed in the related art. The power supply circuit works in a constant-voltage mode, where voltage output by the power supply circuit remains nearly constant, such as 5V (volt), 9V, 12V, 20V, etc.

Voltage output by the power supply circuit is however not suitable for being applied directly to a battery. Instead, the voltage output by the power supply circuit needs to be converted by a conversion circuit of the device to-be-charged, so that expected charging voltage and/or charging current of the battery of the device to-be-charged can be obtained.

The conversion circuit can be configured to convert the voltage output by the power supply circuit, so as to meet requirements on expected charging voltage and/or charging current of the battery.

As an implementation, the conversion circuit can be a charging management module, such as a charging integrated circuit (IC), which, when the battery is charged, is configured to manage the charging voltage and/or the charging current of the battery. The conversion circuit functions as a voltage feedback module and/or a current feedback module, to achieve management of the charging voltage and/or the charging current of the battery.

For example, a charging process of the battery can include at least one of a trickle charging stage, a constant-current charging stage, and a constant-voltage charging stage. In the trickle charging stage, the conversion circuit can utilize a current feedback loop to make current flowing into the battery in the trickle charging stage satisfy expected charging current of the battery (such as a first charging current). In the constant-current charging stage, the conversion circuit can utilize the current feedback loop to make current flowing into the battery in the constant-current charging stage satisfy expected charging current of the battery (such as a second charging current, which may be larger than the first charging current). In the constant-voltage charging stage, the conversion circuit can utilize a voltage feedback loop to make voltage applied to the battery in the constant-voltage charging stage satisfy expected charging voltage of the battery.

As one implementation, when the voltage output by the power supply circuit is higher than the expected charging voltage of the battery, the conversion circuit can be configured to decrease the voltage output by the power supply circuit to make decreased charging voltage meet requirements on the expected charging voltage of the battery. As another implementation, when the voltage output by the power supply circuit is lower than the expected charging voltage of the battery, the conversion circuit can be configured to increase the voltage output by the power supply circuit to make increased charging voltage meet requirements on the expected charging voltage of the battery.

As yet another implementation, the voltage output by the power supply circuit is a constant 5V voltage, for example. When the battery includes one single cell (for example, a lithium battery cell, with a 4.2V charging cut-off voltage), the conversion circuit (such as a Buck circuit) can decrease the voltage output by the power supply circuit to make the decreased charging voltage meet requirements on the expected charging voltage of the battery.

As still another implementation, the voltage output by the power supply circuit is a constant 5V voltage, for example. When the power supply circuit charges a battery with two or more single-cells coupled in series (for example, a lithium battery cell, with a 4.2V charging cut-off voltage), the conversion circuit (such as a Boost circuit) can increase the voltage output by the power supply circuit to make the increased charging voltage meet requirements on the expected charging voltage of the battery.

The conversion circuit is limited by low circuit conversion efficiency, which causes electrical energy that fails to be converted to dissipate in the form of heat. The heat can be accumulated inside the device to-be-charged. Since designed space and heat dissipation space of the device to-be-charged are both very small, for example, the physical size of a user's mobile terminal is increasingly lighter and thinner, and a large number of electronic components are densely arranged in the mobile terminal to improve performance of the mobile terminal at the same time, difficulty in designing the conversion circuit is increased. In addition, it is difficult to remove promptly heat accumulated inside the device to-be-charged, which in turn results in abnormality of the device to-be-charged.

For example, heat accumulated inside the conversion circuit may cause heat interference with electronic components near the conversion circuit, which results in working abnormality of the electronic components. For another example, heat accumulated inside the conversion circuit may shorten service life of the conversion circuit and the electronic components near the conversion circuit. For yet another example, heat accumulated inside the conversion circuit may cause heat interference with the battery, thereby bringing about abnormality of charging and discharging of the battery. For still another example, heat accumulated inside the conversion circuit may raise temperature of the device to-be-charged and thus influence user experience in the charging process. For still another example, heat accumulated inside the conversion circuit may result in short circuit of the conversion circuit itself, causing abnormality of charging since the voltage output by the power supply circuit is applied directly to the battery. In case that the battery is charged with overvoltage for a long time, battery explosion may even occur, endangering the safety of the user.

As illustrated in FIG. 1A, a power supply circuit 10 is provided according to an implementation of the present disclosure. The power supply circuit 10 includes a primary unit 11, a modulating unit 12, a transformer 13, and a secondary rectifier-filter unit 14.

The primary unit 11 is configured to generate a first voltage to-be-modulated according to alternating current (AC) voltage input.

The primary unit 11 can include a primary rectifier unit. The primary rectifier unit can be configured to rectify the AC voltage input to output a voltage which has a magnitude varying periodically. In some cases, the AC voltage input is also known as "mains electricity". The AC voltage input can be, for example, a 220V AC voltage or a 110V AC voltage. The form of the primary rectifier unit is not limited in the present disclosure. The primary rectifier unit can adopt a full-bridge rectifier circuit formed by four diodes, or adopt other forms of rectifier circuits, such as a half-bridge rectifier circuit.

In addition, in some implementations, the primary unit 11 can further include a liquid electrolytic capacitor configured for primary filtering. The liquid electrolytic capacitor can be configured to filter a voltage output by the primary rectifier unit. The liquid electrolytic capacitor has a high capacitance and a strong capacity of filtering and can filter the output of the primary rectifier unit into a constant direct current (DC) voltage. Therefore, in this implementation, the first voltage to-be-modulated has a constant magnitude.

In another implementation, the primary unit 11 does not include the liquid electrolytic capacitor described above. Therefore, in this implementation, the first voltage to-be-modulated described above has a magnitude varying periodically. Implementations of removing the electrolytic capacitor at the primary-side will be described in detail later in connection with FIG. 7-FIG. 8 and is not detailed here.

The modulating unit 12 can be configured to modulate the first voltage to generate a second voltage. In some cases, the modulating unit 12 is also known as a "chopping unit" or a "chopper". Alternatively, in some cases, the modulating unit 12 is also known as a "clamping unit" or a "clamper". The manner in which the modulating unit 12 works is not limited herein. As an implementation, the modulating unit 12 can modulate the first voltage by adopting pulse width modulation (PWM), or by adopting frequency modulation (FM).

Figure 2:
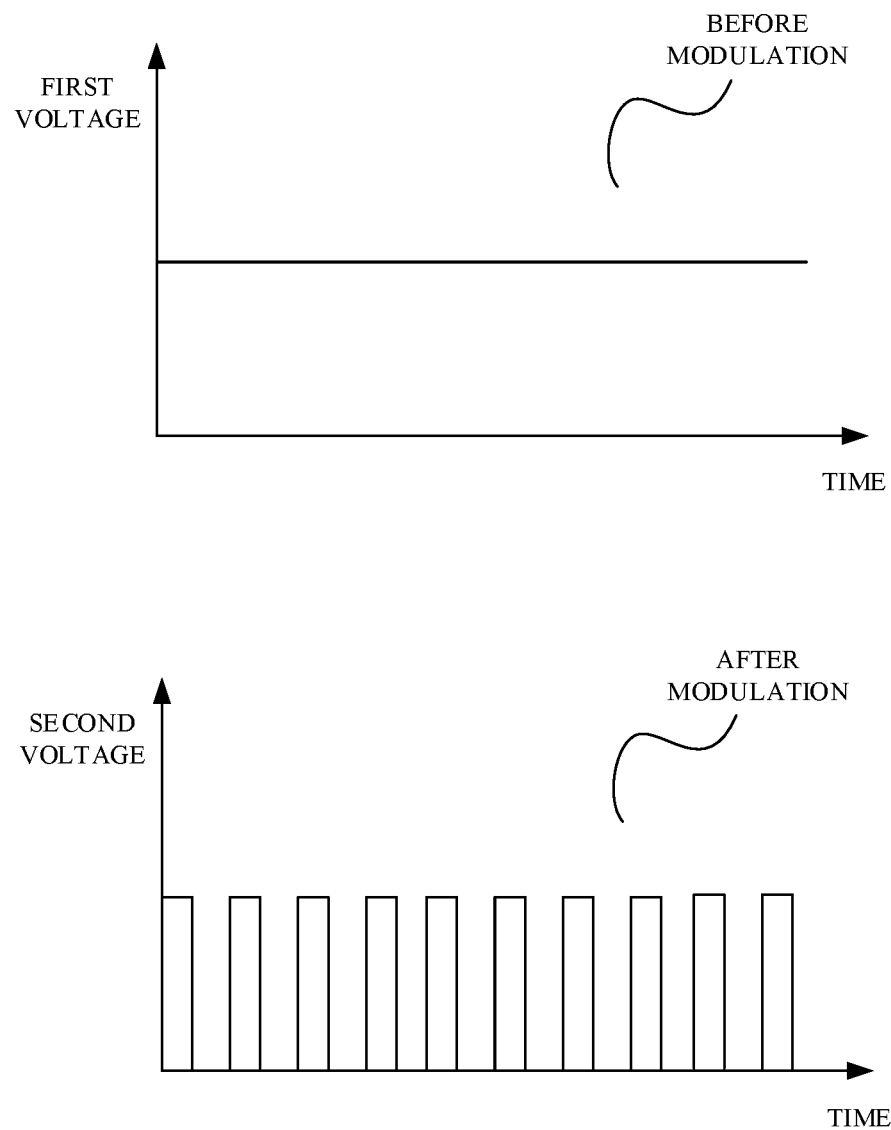
FIG. 2 is a diagram illustrating contrast between a voltage waveform before modulation and a voltage waveform after modulation.

For example, when the primary unit 11 includes the liquid electrolytic capacitor configured for primary filtering, a waveform of the above first voltage to-be-modulated and a waveform of the second voltage obtained after modulation are illustrated in FIG. 2. As illustrated in FIG. 2, through processing of the modulating unit 12, a constant voltage signal is chopped into multiple small square-wave pulse signals which are equal in magnitude.

The transformer 13 is configured to generate a third voltage according to the second voltage. In other words, the transformer 13 is configured to obtain the third voltage by coupling the second voltage from a primary of the transformer ("transformer primary" for short) to a secondary of the transformer ("transformer secondary" for short). For example, the transformer 13 is configured to obtain the third voltage by conducting transformation related operations on the second voltage. The transformer 13 can be a normal transformer or a high frequency transformer working at a frequency of 50 KHz-2 MHz. The transformer 13 can include a primary winding and a secondary winding. The form of the primary winding and the secondary winding of the transformer 13 and the manner in which the primary winding and the secondary winding, are coupled with other units of the power supply circuit 10 depend on the type of a switching power supply adopted in the power supply circuit 10. Exemplarily, the power supply circuit 10 can be a power supply circuit based on a flyback switching power supply, a power supply circuit based on a forward switching power supply, or a power supply circuit based on a push-pull switching power supply. Based on different types of switching power supply, forms of the primary winding and the secondary winding of the transformer 13 and the manner in which the primary winding and the secondary winding are coupled will be different and are not limited herein. FIG. 1A merely illustrates one possible manner of coupling of the transformer 13.

The secondary rectifier-filter unit 14 can include a secondary rectifier unit and a second filter unit. The manner of rectifying of the secondary rectifier unit is not limited in the present disclosure. As an implementation, the secondary rectifier unit can conduct synchronous rectification on a voltage (or a current) inducted by the secondary winding of the transformer with a synchronous rectifier (SR) chip. As another implementation, the secondary rectifier unit can conduct secondary rectification with a diode. The secondary filter unit can conduct secondary filtering on a voltage obtained after the secondary rectification. The secondary filter unit can include one or more solid capacitors or a combination of a solid capacitor(s) and a normal capacitor(s) (such as a ceramic capacitor(s)). An output voltage of the power supply circuit 10 can be obtained after the third voltage is processed by the secondary rectifier-filter unit.

In order to reduce the heat generated during charging of the device to-be-charged, the power supply circuit 10 provided herein is a power supply circuit with adjustable output power. The power supply circuit 10 can include a control unit 15. The control unit 15 can be configured to communicate with the device to-be-charged to adjust the output voltage and/or output current of the power supply circuit 10, to make the output voltage and/or the output current match a present charging stage of a battery of the device to-be-charged.

It should be understood that, the charging stage of the battery can include at least one of the trickle charging stage, the constant-voltage charging stage, and the constant-current charging stage.

As an implementation, the battery is currently in the constant-voltage charging stage, and the control unit 15 configured to communicate with the device to-be-charged to adjust the output power of the power supply circuit, to make the output voltage and/or the output current of the power supply circuit match the present charging stage of the battery of the device to-be-charged is configured to: in the constant-voltage charging stage, communicate with the device to-be-charged to adjust the output power of the power supply circuit, to make the output voltage of the power supply circuit match a charging voltage corresponding to the constant-voltage charging stage.

As an implementation, the battery is currently in the constant-current charging stage, and the control unit 15 configured to communicate with the device to-be-charged to adjust the output power of the power supply circuit, to make the output voltage and/or the output current of the power supply circuit match the present charging stage of the battery of the device to-be-charged is configured to: in the constant-current charging stage, communicate with the device to-be-charged to adjust the output power of the power supply circuit, to make the output current of the power supply circuit match a charging current corresponding to the constant-current charging stage.

In terms of the power supply circuit 10 with a communication function provided herein, more detailed examples will be given below.

The power supply circuit 10 can acquire state information of the battery. The state information of the battery can include present power and/or present voltage of the battery. The power supply circuit 10 can adjust its own output voltage according to the state information of the battery acquired to meet requirements on charging voltage and/or charging current of the battery. Output voltage adjusted by the power supply circuit 10 can be applied directly to the battery for charging (referred to as "direct charging" hereinafter). In addition, in the constant-current charging stage of the battery, the output voltage adjusted by the power supply circuit 10 can be applied directly to the battery for charging.

The power supply circuit 10 can function as a voltage feedback module and/or a current feedback module to achieve management of the charging voltage and/or charging current of the battery.

The power supply circuit 10 can adjust its own output voltage of the power supply circuit 10 according to the state information of the battery acquired as follows. The power supply circuit 10 can acquire in real time the state information of the battery and adjust its own output voltage according to real-time state information of the battery acquired each time to meet requirements on the charging voltage and/or charging current of the battery.

The power supply circuit 10 can adjust its own output voltage according to the real-time state information of the battery acquired as follows. With increase in voltage of the battery in the charging process, the power supply circuit 10 can acquire present state information of the battery at different time points in the charging process and adjust in real time its own output voltage according to the present state information of the battery, so as to meet requirements on the charging voltage and/or charging current of the battery.

For example, the charging process of the battery can include at least one of the trickle charging stage, the constant-current charging stage, and the constant-voltage charging stage. In the trickle charging stage, the power supply circuit 10 can output the first charging current in the trickle charging stage to charge the battery, to meet requirements on charging current (the first charging current can be a constant DC current) of the battery. In the constant-current charging stage, the power supply circuit 10 can utilize the current feedback loop to make the current output in the constant-current charging stage from the power supply circuit 10 to the battery meet requirements of the battery on charging current, such as the second charging current. The second charging current may be a pulse wave current and may be larger than the first charging current, where a peak value (that is, peak current) of the pulse wave current in the constant-current charging stage may be greater than magnitude of the constant DC current in the trickle charging stage, and "constant-current" in the constant-current charging stage may refer to a situation where the peak value or average value of the pulse wave current remains nearly constant. In the constant-voltage charging stage, the power supply circuit 10 can utilize the voltage feedback loop to make the voltage (that is, constant DC voltage) output in the constant-voltage charging stage from the power supply circuit 10 to the device to-be-charged remain constant.

For example, in implementations of the present disclosure, the power supply circuit 10 can be mainly configured to control the constant-current charging stage of the battery of the device to-be-charged. In other implementations, control of the trickle charging stage and the constant-voltage charging stage of the battery of the device to-be-charged can also be cooperatively completed by the power supply circuit 10 provided herein and an extra charging chip of the device to-be-charged. Compared with charging power of the battery received in the constant-current charging stage, the charging power of the battery received in the trickle charging stage or in the constant-voltage charging stage is lower, so conversion efficiency loss and heat accumulation of the charging chip of the device to-be-charged are acceptable. It should be noted that, in implementations of the present disclosure, the "constant-current charging stage" or the "constant-current stage" can refer to a charging mode of controlling the output current of the power supply circuit 10, but does not require that the output current of the power supply circuit 10 remain completely constant, and can mean, for example, that the peak value or the average value of a pulse wave current output by the power supply circuit 10 remains nearly constant, or remains nearly constant within a certain time period. Practically, for example, in the constant-current charging stage, the power supply circuit 10 usually charges the battery in a multi-stage constant current charging manner.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the $N^{th}$ stage. When a previous constant-current stage ends and a next constant-current stage begins, the peak value or the average value of the pulse wave current may decrease. When voltage of the battery reaches a threshold of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

In addition, in case that the current output by the power supply circuit 10 is a current which has a magnitude varying periodically, such as a pulsating DC current, the constant-current mode can refer to a charging mode of controlling a peak value or an average value of the pulsating DC current, that is, controlling the peak value of the current output by the power supply circuit 10 not to be greater than current corresponding to the constant-current mode. Furthermore, in case that the current output by the power supply circuit 10 is an AC current, the constant-current mode can refer to a charging mode of controlling a peak value of the AC current.

In some implementations, the power supply circuit 10 is selectively operable in a first charging mode or a second charging mode. Charging speed of the power supply circuit 10 charging the battery in the second charging mode is faster than that in the first charging mode. In other words, compared with the power supply circuit working in the first charging mode, the power supply circuit working in the second charging mode takes less time to charge a battery of the same capacity. In addition, in some implementations, in the first charging mode, the power supply circuit 10 charges the battery through a second charging channel; in the second charging mode, the power supply circuit 10 charges the battery through a first charging channel.

The first charging mode can be a normal charging mode. The second charging mode can be a quick charging mode. In the normal charging mode, the power supply circuit outputs smaller current (usually lower than 2.5 A (ampere)) or adopts low power (usually lower than 15 W (watt)) to charge the battery of the device to-be-charged. In the normal charging mode, charging fully a battery of high capacity (such as a 3000 mA battery) usually takes several hours. In the quick charging mode, however, the power supply circuit can output larger current (usually larger than 2.5 A, such as 4.5 A, 5 A, or even larger) or adopt higher power (usually higher than or equal to 15 W) to charge the battery of the device to-be-charged. Compared with the normal charging mode, in the quick charging mode, the power supply circuit can charge fully the battery of the same capacity within a substantially shorter charging period and at a faster charging speed.

In addition, the device to-be-charged can conduct two-way communication (that is, communicate bi-directionally) with the power supply circuit 10 (or with the control unit 15 of the power supply circuit 10), to control output of the power supply circuit 10 in the second charging mode, that is, to control charging voltage and/or charging current provided by the power supply circuit 10 in the second charging mode. The device to-be-charged can include a charging interface and communicate with the power supply circuit 10 through a data line of the charging interface. For instance, the charging interface can be a universal serial bus (USB) interface. The data line can be a D+ line and/or a D− line of the USB interface. Alternatively, the device to-be-charged can also conduct wireless communication with the power supply circuit 10.

Content communicated between the power supply circuit 10 and the device to-be-charged and control manners of the device to-be-charged on output of the power supply circuit 10 in the second charging mode are not limited herein. For example, the device to-be-charged can communicate with the power supply circuit 10, interact with present total voltage and/or present total power of the battery of the device to-be-charged, and adjust the output voltage and/or the output current of the power supply circuit 10 according to the present total voltage and/or the present power of the battery. The following will describe in detail the content communicated between the device to-be-charged and the power supply circuit 10 and the control manners of the device to-be-charged on output of the power supply circuit 10 in the second charging mode in conjunction with implementations of the disclosure.

Description above does not limit master-slave relationship between the power supply circuit 10 and the device to-be-charged. That is to say, any one of the power supply circuit 10 and the device to-be-charged can function as a master device to initiate a two-way communication, and correspondingly the other one of the power supply circuit 10 and the device to-be-charged can function as a slave device to make a first response or a first reply to the communication initiated by the master device. As a practical manner, identities of the master device and the slave device can be determined by comparing levels of the power supply circuit 10 and the device to-be-charged with reference to earth in a communication process.

The implementation of the two-way communication between the power supply circuit 10 and the device to-be-charged is not limited herein. In other words, any one of the power supply circuit 10 and the device to-be-charged can function as the master device to initiate the communication, and correspondingly the other one of the power supply circuit 10 and the device to-be-charged can function as the slave device to make the first response or the first reply to the communication initiated by the master device. Besides, the master device can make a second response to the first response or the first reply of the slave device, as such, the master device and the slave device complete a negotiation on charging modes. As a possible implementation, charging between the master device and the slave device can be executed after completion of multiple negotiations on charging modes between the master device and the slave device, so as to guarantee that the charging process is safe and reliable after negotiation.

The master device can make the second response to the first response or the first reply to the communication of the slave device as follows. The master device receives from the slave device the first response or the first reply to the communication and makes the second response to the first response or the first reply of the slave device. As an example, when the master device receives from the slave device the first response or the first reply to the communication within a preset time period, the master device can make the second response to the first response or the first reply of the slave device as follows. The master device and the slave device complete a negotiation on charging modes. Charging between the master device and the slave device is executed in the first charging mode or in the second charging mode according to the negotiation result, that is, the power supply circuit 10 is operable in the first charging mode or in the second charging mode to charge the device to-be-charged according to the negotiation.

The master device can also make the second response to the first response or the first reply to the communication of the slave device as follows. When the master device fails to receive from the slave device the first response or the first reply to the communication within a preset time period, the master device can still make the second response to the first response or the first reply made by the slave device. As an example, when the master device fails to receive from the slave device the first response or the first reply to the communication within a preset time period, the master device can still make the second response to the first response or the first reply made by the slave device as follows: the master device and the slave device complete a negotiation on charging modes. Charging is executed in the first charging mode between the master device and the slave device, that is, the power supply circuit 10 is operable in the first charging mode to charge the device to-be-charged.

In some implementations, after the device to-be-charged, as the master device, initiates the communication and the power supply circuit 10, as the slave device, makes the first response or the first reply to the communication initiated by the master device, without the device to-be-charged making the second response to the first response or the first reply of the power supply circuit 10, it can be considered that the power supply circuit 10 and the device to-be-charged complete a negotiation on charging modes, and thus the power supply circuit 10 can determine to charge the device to-be-charged in the first charging mode or in the second charging mode according to the negotiation.

In some implementations, the device to-be-charged conducts two-way communication with the power supply circuit 10, to control output of the power supply circuit 10 in the second charging mode as follows. The device to-be-charged conducts two-way communication with the power supply circuit 10, to negotiate charging modes between the power supply circuit 10 and the device to-be-charged.

In some implementations, the device to-be-charged conducts two-way communication with the power supply circuit 10 to negotiate charging modes between the power supply circuit 10 and the device to-be-charged as follows. The device to-be-charged receives a first instruction from the power supply circuit 10, and the first instruction is for enquiring whether the device to-be-charged enables (in other words, switches on) the second charging mode; the device to-be-charged sends a reply instruction of the first instruction to the power supply circuit 10, and the reply instruction of the first instruction is for indicating whether the device to-be-charged agrees to enable the second charging mode; in case that the device to-be-charged agrees to enable the second charging mode, the device to-be-charged controls the power supply circuit 10 to charge the battery though the first charging channel.

In some implementations, the device to-be-charged conducts two-way communication with the power supply circuit 10 to control output of the power supply circuit 10 in the second charging mode as follows. The device to-be-charged conducts two-way communication with the power supply circuit 10, to determine charging voltage which is output by the power supply circuit 10 in the second charging mode and used for charging the device to-be-charged.

In some implementations, the device to-be-charged conducts two-way communication with the power supply circuit 10, to determine the charging voltage which is output by the power supply circuit 10 and used for charging the device to-be-charged as follows. The device to-be-charged receives from the power supply circuit 10 a second instruction, and the second instruction is for enquiring whether the charging voltage output by the power supply circuit 10 matches present total voltage of the battery of the device to-be-charged; the device to-be-charged sends a reply instruction of the second instruction to the power supply circuit 10, and the reply instruction of the second instruction is for indicating that the voltage output by the power supply circuit 10 matches the present total voltage of the battery or does not match, that is, is high or is low. Alternatively, the second instruction can be for enquiring whether it is suitable to use present output voltage of the power supply circuit 10 as the charging voltage, which is output by the power supply circuit 10 in the second charging mode and used for charging the device to-be-charged. The reply instruction of the second instruction is for indicating whether the present output voltage of the power supply circuit 10 is suitable or unsuitable, that is, high or at low.

The expression of "present output voltage of the power supply circuit 10 matches the present total voltage of the battery" or "the present output voltage of the power supply circuit 10 is suitable to be used as the charging voltage which is output by the power supply circuit 10 in the second charging mode and used for charging the device to-be-charged" can be comprehended as follows. The difference between the output voltage of the power supply circuit 10 and the present total voltage of the battery is within a preset range (usually at a magnitude of several hundred millivolts (mV)). The expression of "the present output voltage is higher" can be comprehended as follows. The difference between the output voltage of the power supply circuit 10 and the present total voltage of the battery is greater than the preset range. The expression of "the present output voltage is lower" can be comprehended as follows. The difference between the output voltage of the power supply circuit 10 and the present total voltage of the battery is smaller than the preset range.

In some implementations, the device to-be-charged can conduct two-way communication with the power supply circuit 10, to control output of the power supply circuit 10 in the second charging mode as follows. The device to-be-charged conducts two-way communication with the power supply circuit 10 to determine charging current which is output by the power supply circuit 10 in the second charging mode and used for charging the device to-be-charged.

In some implementations, the device to-be-charged can conduct two-way communication with the power supply circuit 10 to determine the charging current which is output by the power supply circuit 10 in the second charging mode and used for charging the device to-be-charged as follows. The device to-be-charged receives from the power supply circuit 10 a third instruction, and the third instruction is for enquiring a maximum charging current the device to-be-charged currently supports; the device to-be-charged sends a reply instruction of the third instruction to the power supply circuit 10, and the reply instruction of the third instruction is for indicating the maximum charging current the device to-be-charged currently supports, so that the power supply circuit 10 can determine the charging current which is output by the power supply circuit 10 in the second charging mode and used for charging the device to-be-charged, according to the maximum charging current the device to-be-charged currently supports.

The maximum charging current the device to-be-charged currently supports can be determined according to the capacity of the battery, the battery cell system, or the like of the device to-be-charged, or can be a preset value.

It should be understood that, the manner in which the device to-be-charged determines the charging current which is output by the power supply circuit 10 in the second charging mode and used for charging the device to-be-charged according to the maximum charging current the device to-be-charged currently supports is various. For example, the power supply circuit 10 can determine the maximum charging current the device to-be-charged currently supports as the charging current which is output by the power supply circuit 10 in the second charging mode and used for charging the device to-be-charged, or comprehensively take into account the maximum charging current the device to-be-charged currently supports and other factors such as current output capability of the power supply circuit 10 itself and the like, to determine the charging current which is output by the power supply circuit 10 in the second charging mode and used for charging the device to-be-charged.

In some implementations, the device to-be-charged conducts two-way communication with the power supply circuit 10 to control output of the power supply circuit 10 in the second charging mode as follows. The device to-be-charged conducts two-way communication with the power supply circuit 10 to adjust the output current of the power supply circuit 10 in the second charging mode.

In some implementations, the device to-be-charged conducts two-way communication with the power supply circuit 10 to adjust the output current of the power supply circuit 10 as follows. The device to-be-charged receives a fourth instruction from the power supply circuit 10, and the fourth instruction is for enquiring present total voltage of the battery; the device to-be-charged sends a reply instruction of the fourth instruction to the power supply circuit 10, and the reply instruction of the fourth instruction is for indicating the present total voltage of the battery, so that the power supply circuit 10 can adjust the output current of the power supply circuit 10 according to the present total voltage of the battery.

In some implementations, the device to-be-charged conducts two-way communication with the power supply circuit 10, to control output of the power supply circuit 10 in the second charging mode as follows. The device to-be-charged conducts two-way communication with the power supply circuit 10 to determine whether there is contact failure in a charging interface.

In some implementations, the device to-be-charged can conduct two-way communication with the power supply circuit 10 to determine whether there is contact failure in the charging interface as follows. The device to-be-charged receives a fourth instruction from the power supply circuit 10, and the fourth instruction is for enquiring present voltage of the battery of the device to-be-charged; the device to-be-charged sends a reply instruction of the fourth instruction to the power supply circuit 10, and the reply instruction of the fourth instruction is for indicating the present voltage of the battery of the device to-be-charged, so that the power supply circuit 10 can determine whether there is contact failure in the charging interface according to output voltage of the power supply circuit 10 and the present voltage of the battery of the device to-be-charged. For instance, in case that the power supply circuit 10 determines that a difference between the output voltage of the power supply circuit 10 and the present voltage of the battery of the device to-be-charged is greater than a preset voltage threshold, it indicates that impedance, which is obtained by the difference (that is, the difference between the output voltage of the power supply circuit 10 and the present voltage of the battery of the device to-be-charged) divided by present output current of the power supply circuit 10, is greater than a preset impedance threshold, and it can be determined that there is contact failure in the charging interface.

In some implementations, contact failure in the charging interface can be determined by the device to-be-charged. For example, the device to-be-charged sends a sixth instruction to the power supply circuit 10, and the sixth instruction is for enquiring the output voltage of the power supply circuit 10; the device to-be-charged receives from the power supply circuit 10 a reply instruction of the sixth instruction, and the reply instruction of the sixth instruction is for indicating the output voltage of the power supply circuit 10; the device to-be-charged determines whether there is contact failure in the charging interface according to present voltage of the battery and the output voltage of the power supply circuit 10. When the device to-be-charged determines that there is contact failure in the charging interface, the device to-be-charged 23 can send a fifth instruction to the power supply circuit 10, and the fifth instruction is for indicating contact failure in the charging interface. After receiving the fifth instruction, the power supply circuit 10 can exit the second charging mode.

Figure 3:
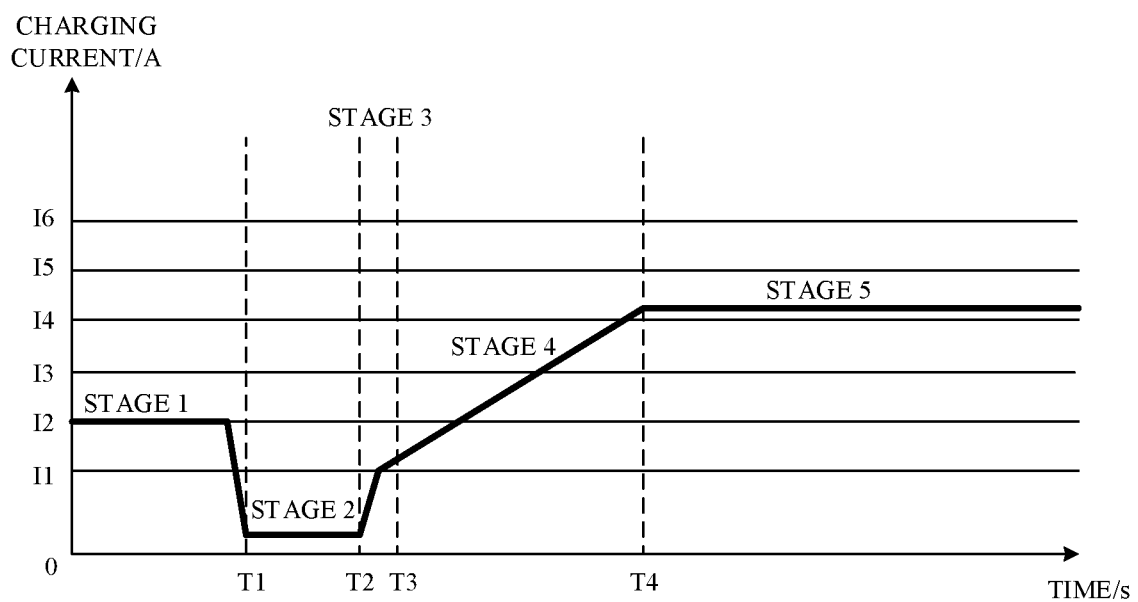
FIG. 3 is a schematic flowchart illustrating a quick charging process according to an implementation of the present disclosure.

The following will describe in detail a communication process between the power supply circuit 10 and the device to-be-charged in conjunction with FIG. 3. It should be noted that, the example of FIG. 3 is just for those skilled in the art to understand the implementations of the disclosure, instead of limiting the implementations of the disclosure to specific numeric values or specific situations of the example. Those skilled in the art can make various equivalent modifications and changes without departing from the scope of the implementations of the disclosure.

As illustrated in FIG. 3, the communication procedure (also referred to as the communication procedure of a quick charging process) between the power supply circuit 10 and the device to-be-charged can include the following five stages.

Stage 1:

After the device to-be-charged is coupled with the power supply circuit 10, the device to-be-charged can detect the type of the power supply circuit 10 though data line D+ and data line D−. When the power supply circuit 10 is detected to be a power supply circuit specially configured to charge such as an adaptor, current absorbed by the device to-be-charged can be larger than a preset current threshold 12 (can be 1 A, for example). When the power supply circuit 10 detects that output current of the power supply circuit 10 is larger than or equal to 12 within a preset duration (can be a continuous time period T1, for example), the power supply circuit 10 can consider that identification of the type of the power supply circuit by the device to-be-charged is completed. Next, the power supply circuit 10 begins a negotiation process with the device to-be-charged and send Instruction 1 (corresponding to the first instruction mentioned above), to enquire whether the device to-be-charged agrees to be charged by the power supply circuit 10 in the second charging mode.

When the power supply circuit 10 receives a reply instruction of Instruction 1 and the reply instruction of Instruction 1 indicates that the device to-be-charged disagrees to be charged by the power supply circuit 10 in the second charging mode, the power supply circuit 10 detects once again the output current of the power supply circuit 10. When the output current of the power supply circuit 10 is still larger than or equal to 12 within a preset continuous duration (can be a continuous time period T1, for example), the power supply circuit 10 sends once again Instruction 1 to enquire whether the device to-be-charged agrees to be charged by the power supply circuit 10 in the second charging mode. The power supply circuit 10 repeats the above operations at Stage 1 until the device to-be-charged agrees to be charged by the power supply circuit 10 in the second charging mode, or the output current of the power supply circuit 10 is no longer larger than or equal to 12.

When the device to-be-charged agrees to be charged by the power supply circuit 10 in the second charging mode, the communication procedure proceeds to Stage 2.

Stage 2:

The power supply circuit 10 sends Instruction 2 (corresponding to the second instruction mentioned above) to enquire whether the output voltage of the power supply circuit 10 (present output-voltage) matches present voltage of the battery of the device to-be-charged.

The device to-be-charged sends a reply instruction of Instruction 2 to indicate whether the output voltage of the power supply circuit 10 matches the present voltage of the battery of the device to-be-charged, is high, or is low. When the reply instruction of Instruction 2 indicates that the output voltage of the power supply circuit 10 is high or is low, the power supply circuit 10 can adjust its own output voltage to lower voltage or higher voltage and send once again Instruction 2 to the device to-be-charged to enquire whether the output voltage of the power supply circuit 10 matches the present voltage of the battery. Repeat the above operations until the device to-be-charged determines that the output voltage of the power supply circuit 10 matches the present voltage of the battery of the device to-be-charged and proceed to Stage 3. The manner in which the output voltage of the power supply circuit 10 is adjusted can be various. For example, the output voltage of the power supply circuit 10 can be pre-set to correspond to multiple voltage grades from low to high, the higher the voltage grade, the higher the output voltage of the power supply circuit 10. In case that the reply instruction of Instruction 2 indicates that the output voltage of the power supply circuit 10 is high, the output voltage of the power supply circuit 10 can be decreased by one grade from a present grade; in case that the reply instruction of Instruction 2 indicates that the output voltage of the power supply circuit 10 is low, the output voltage of the power supply circuit 10 can be increased by one grade from the present grade.

Stage 3:

The power supply circuit 10 sends Instruction 3 (corresponding to the third instruction mentioned above) to enquire a maximum charging current the device to-be-charged currently supports. The device to-be-charged sends a reply instruction of Instruction 3 to indicate the maximum charging current the device to-be-charged currently supports. Proceed to Stage 4.

Stage 4:

The power supply circuit 10 determines, according to the maximum charging current the device to-be-charged currently supports, the charging current which is output by the power supply circuit 10 in the second charging mode and used for charging the device to-be-charged. Proceed to Stage 5, that is, the constant-current charging stage.

Stage 5:

After proceeding to the constant-current charging stage, the power supply circuit 10 can send Instruction 4 (corresponding to the fourth instruction mentioned above) to the device to-be-charged at certain time intervals, to enquire present voltage of the battery of the device to-be-charged. The device to-be-charged can send a reply instruction of Instruction 4 to feed back the present voltage of the battery. The power supply circuit 10 can determine whether the charging interface is in a good contact and whether it is necessary to reduce the output current of the power supply circuit 10, according to the present voltage of the battery. When the power supply circuit 10 determines that there is contact failure in the charging interface, the power supply circuit 10 can send Instruction 5 (corresponding to the fifth instruction mentioned above) to the device to-be-charged, thereby exiting the second charging mode and being reset to return to Stage 1.

In some implementations, at Stage 2, duration from when the device to-be-charged agrees to be charged by the power supply circuit 10 in the second charging mode to when the power supply circuit 10 adjusts the output voltage thereof to a suitable charging voltage can be controlled within a certain range. When the duration is beyond the certain range, the power supply circuit 10 or the device to-be-charged can determine that the communication process is abnormal, being reset to return to Stage 1.

In some implementations, at Stage 2, when the output voltage of the power supply circuit 10 is higher than the present voltage of the battery of the device to-be-charged by A V (A V can be set between 200 mV and 500 mV), the device to-be-charged can send the reply instruction of Instruction 2 to indicate that the output voltage of the power supply circuit 10 matches the voltage of the battery of the device to-be-charged.

In some implementations, at Stage 4, adjusting speed of the output current of the power supply circuit 10 can be controlled within a certain range, to avoid abnormality of the charging process resulting from excessively high adjusting speed.

In some implementations, at Stage 5, change magnitude of the output current of the power supply circuit 10 can be controlled within 5%.

In some implementations, at Stage 5, the power supply circuit 10 can detect in real time impedance of charging path. Specifically, the power supply circuit 10 can detect the impedance of charging path according to the output voltage and the output current of the power supply circuit 10 and the present voltage of the battery fed back by the device to-be-charged. When the impedance of charging path is higher than the impedance of path of the device to-be-charged plus impedance of a charging cable, it indicates that there is contact failure in the charging interface, and thus the power supply circuit 10 stops charging the device to-be-charged in the second charging mode.

In some implementations, after the power supply circuit 10 enables the second charging mode to charge the device to-be-charged, time intervals of communication between the power supply circuit 10 and the device to-be-charged can be controlled within a certain range, to avoid abnormality of communication resulting from excessively short time intervals of communication.

In some implementations, stopping of the charging process (specifically, stopping of charging of the device to-be-charged by the power supply circuit 10 in the second charging mode) can include a recoverable stopping and a non-recoverable stopping.

For example, when it is detected that the battery of the device to-be-charged is fully charged or there is contact failure (that is, poor contact) in the charging interface, the charging process stops, a charging communication process is reset, and the charging process enters again Stage 1. Then, when the device to-be-charged disagrees to be charged by the power supply circuit 10 in the second charging mode, the communication process will not proceed to Stage 2. The stopping of the charging process in this case can be considered as the non-recoverable stopping.

For another example, when abnormality occurs in the communication between the power supply circuit 10 and the device to-be-charged, the charging process stops, the charging communication process is reset, and the charging process enters again Stage 1. After requirements on Stage 1 are satisfied, the device to-be-charged agrees to be charged by the power supply circuit 10 in the second charging mode to recover the charging process. The stopping of the charging process in this case can be considered as the recoverable stopping.

For yet another example, when the device to-be-charged detects battery abnormality, the charging process stops, is reset, and enters again Stage 1. Then, the device to-be-charged disagrees to be charged by the power supply circuit 10 in the second charging mode. After the battery returns to normal and the requirements on Stage 1 are met, the device to-be-charged agrees to be charged by the power supply circuit 10 in the second charging mode. The stopping of the quick charging process in this case can be considered as the recoverable stopping.

The above communication steps or operations of FIG. 3 are just illustrative. For instance, at Stage 1, after the device to-be-charged is coupled with the power supply circuit 10, handshake communication between the device to-be-charged and the power supply circuit 10 can also be initiated by the device to-be-charged. In other words, the device to-be-charged sends Instruction 1, to enquire whether the power supply circuit 10 enables the second charging mode. When the device to-be-charged receives from the power supply circuit 10 a reply instruction which indicates that the power supply circuit 10 agrees to charge the device to-be-charged in the second charging mode, the power supply circuit 10 begins to charge the battery of the device to-be-charged in the second charging mode.

For another instance, after Stage 5, the communication procedure can further include the constant-voltage charging stage. Specifically, at Stage 5, the device to-be-charged can feed back the present voltage of the battery to the power supply circuit 10. When the present voltage of the battery reaches a threshold of charging voltage in the constant-voltage charging stage, the charging stage turns to the constant-voltage charging stage from the constant-current charging stage. In the constant-voltage charging stage, the charging current gradually decreases. When the charging current decreases to a certain threshold, it indicates that the battery of the device to-be-charged is fully charged, and thus the whole charging process is completed and stopped.

As illustrated in FIG. 1A, in some implementations, the power supply circuit 10 can further include a voltage feedback unit 16. The voltage feedback unit 16 can be configured to receive the output voltage, and to send a feedback signal to the modulating unit when magnitude of the output voltage reaches a preset value. The modulating unit 12 can be configured to modulate the first voltage to generate the second voltage according to the feedback signal, to limit the magnitude of the output voltage within a first voltage range or a second voltage range different from the first voltage range.

First, the power supply circuit 10 can determine, according to realities of situations, whether an adjustable voltage range of the voltage feedback unit 16 is the first voltage range or the second voltage range. For example, when the power supply circuit 10 needs to charge one single cell, the adjustable voltage range of the voltage feedback unit 16 can be set to the first voltage range (such as 3V-5V); when the power supply circuit 10 needs to charge two cells coupled in series, the adjustable voltage range of the voltage feedback unit 16 can be set to the second voltage range (such as 6V-10V).

In the following, the process in which the modulating unit 12 generates the second voltage by modulating the first voltage will be described in detail. Here, the adjustable voltage range of the voltage feedback unit 16 is the first voltage range, and a voltage threshold of the voltage feedback unit 16 is the upper limit of the first voltage range (or can be any value within the first voltage range). Assuming that the modulating unit 12 is one based on a PWM controller, when the power supply circuit 10 begins to work, the output voltage of the power supply circuit 10 is low. In this case, in terms of generating the second voltage, the modulating unit 12 can modulate the first voltage by continuously increasing the duty cycle of a PWM control signal. In this way, the power supply circuit 10 can extract more energy from the AC voltage input per unit time, and the output voltage of the power supply circuit 10 can be continuously increased. When the output voltage of the power supply circuit 10 reaches the upper limit of the first voltage range, the modulating unit 12 will receive the feedback signal from the voltage feedback unit 16. In this case, in terms of generating the second voltage, the modulating unit 12 can modulate the first voltage by keeping the duty cycle of the PWM control signal constant, in this way, the output voltage of the power supply circuit 10 will not exceed the upper limit of the first voltage range.

Figure 1B:
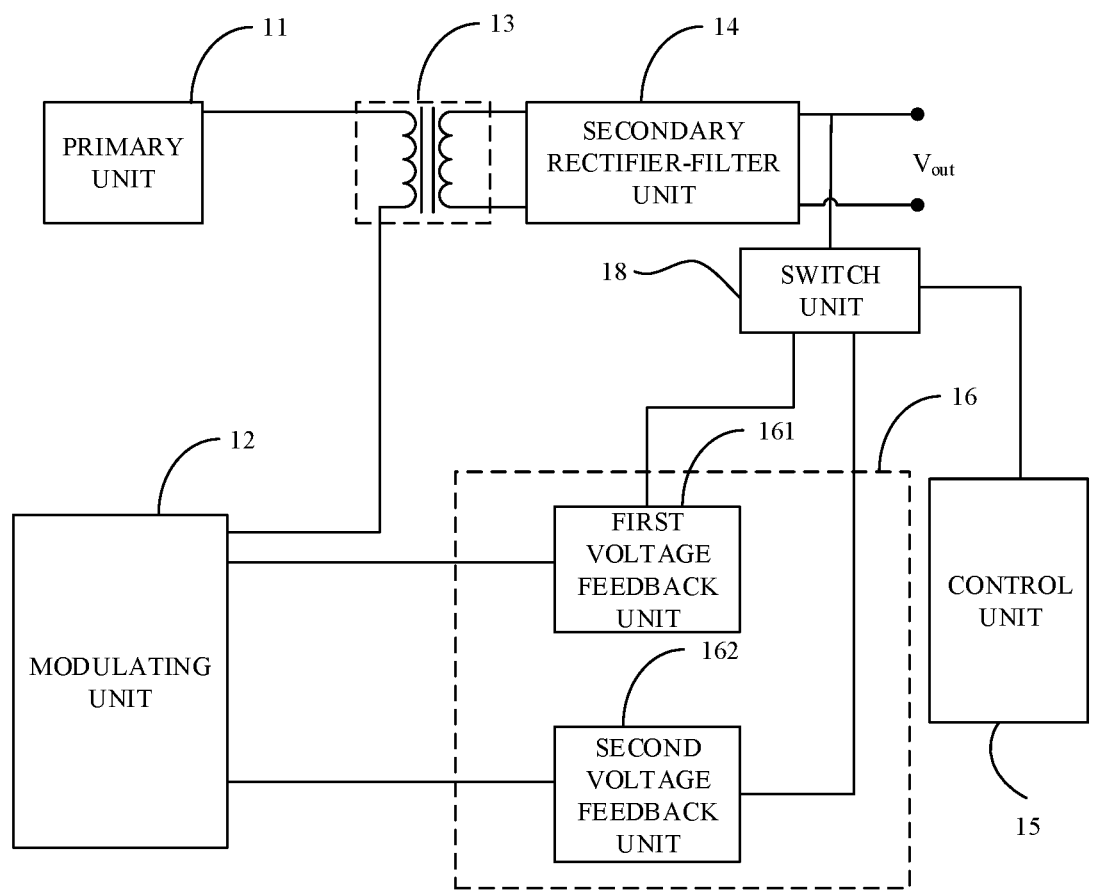
FIG. 1B is a schematic structural diagram illustrating a power supply circuit according to an implementation of the present disclosure.

As illustrated in FIG. 1B, the voltage feedback unit 16 above can include a first voltage feedback unit 161 and a second voltage feedback unit 162.

The first voltage feedback unit 161 can be configured to limit the output voltage of the power supply circuit 10 to the first voltage range together with the modulating unit 12.

For example, the first voltage feedback unit 161 can be configured to receive the output voltage of the power supply circuit 10, and to send a first feedback signal to the modulating unit when the magnitude of the output voltage reaches a voltage threshold of the first voltage feedback unit 161. The voltage threshold of the first voltage feedback unit 161 can be any value within the first voltage range.

The modulating unit can be configured to modulate the first voltage to generate the second voltage according to the first feedback signal, to limit the magnitude of the output voltage of the power supply circuit 10 below the voltage threshold of the first voltage feedback unit 161.

The second voltage feedback unit 162 can be configured to limit the output voltage of the power supply circuit 10 to the second voltage range together with the modulating unit 12.

For example, the second voltage feedback unit 162 can be configured to receive the output voltage of the power supply circuit 10, and to send a second feedback signal to the modulating unit when the output voltage reaches a voltage threshold of the second voltage feedback unit 162. The voltage threshold of the second voltage feedback unit 162 can be any value within the second voltage range.

The modulating unit 12 can be configured to modulate the first voltage to generate the second voltage according to the second feedback signal, to limit the magnitude of the output voltage of the power supply circuit 10 below the voltage threshold of the second voltage feedback unit 162.

The power supply circuit 10 can further include a switch unit 18. The switch unit 18 is for switching between the first voltage feedback unit 161 and the second voltage feedback unit 162. The switch unit 18 can be, for example, a single-pole double-throw switch, or other types of switch components such as a metal oxide semiconductor (MOS) transistor.

The control unit 15 can be further configured to select, through the switch unit 18, one of the first voltage feedback unit 161 and the second voltage feedback unit 162 for use.

The factor taken into account when the control unit 15 selects one of the above two voltage feedback units for use is not limited herein. As an implementation, the control unit 15 can select one of the above two voltage feedback units for use according to the number of cells coupled in series in the device to-be-charged. For example, the control unit 15 can communicate with the device to-be-charged to determine the number of cells coupled in series in the battery of the device to-be-charged. When the battery includes one single cell, the one with a smaller voltage range in the first voltage feedback unit 161 and the second voltage feedback unit 162 can be selected for use. When the battery includes multiple cells coupled in series, the one with a greater voltage range in the first voltage feedback unit 161 and the second voltage feedback unit 162 can be selected for use. As another implementation, the control unit 15 can select one of the above two voltage feedback units for use according to the present charging stage of the battery.

The power supply circuit 10 provided herein has multiple voltage feedback units, each of which can limit the output voltage of the power supply circuit 10 to a different voltage range. The power supply circuit 10 can select one voltage feedback unit from different voltage feedback units according to actual needs, which improves flexibility of charging control.

The battery of the device to-be-charged can include one single cell, or multiple cells coupled in series. Requirements of the device-to-be charged on the output voltage of the power supply circuit 10 depend on the number of cells included in the battery. As an implementation, the battery of the device-to-be charged includes one single cell, and the output voltage of the power supply circuit 10 required by the device to-be-charged is generally 3V-5V. As another implementation, the battery of the device-to-be charged includes two cells, and the output voltage of the power supply circuit 10 required by the device to-be-charged is generally 6V-10V. In order to be compatible with different output voltage requirements of one single cell and two cells, one possible manner is to provide the power supply circuit 10 with a voltage feedback unit, and the output voltage of the power supply circuit 10 is adjustable in a range of 3V-10V under the control of the voltage feedback unit. However, such a scheme has the following disadvantage. Assuming that the battery of the device-to-be charged includes one single cell, in a charging process of the one single cell, in case that the control unit of the power supply circuit 10 experiences a failure, it is impossible to control the output voltage of the power supply circuit 10. Since the output voltage of the power supply circuit 10 is adjustable in a range of 3V-10V, the output voltage of the power supply circuit 10 may be higher than 5V without the control of the control unit, which may result in overvoltage of the one single cell and thus causes risk.

In order to avoid the problem described above, the power supply circuit 10 of the implementations of the disclosure can be adopted, in which multiple voltage feedback units are provided, and the adjustable voltage range of different voltage feedback units can be designed according to the number of cells coupled in series of the device to-be-charged. For instance, a first adjustable voltage range of the first voltage feedback unit 161 can be designed for one single cell, such as 3V-5V; a second adjustable voltage range of the second voltage feedback unit 162 can be designed for two cells coupled in series, such as 6V-10V. When the power supply circuit 10 needs to charge one single cell, the first voltage feedback unit 161 can be controlled to work through the switch unit 18, to make the output voltage of the power supply circuit 10 be adjustable in a range of 3V-5V; when the power supply circuit 10 needs to charge two cells coupled in series, the second voltage feedback unit 162 can be controlled to work through the switch unit 18, to make the output voltage of the power supply circuit 10 be adjustable in a range of 6V-10V.

In case that one single cell is adopted for charging, the control unit 15 will select the first voltage feedback unit, which can limit the output voltage of the power supply circuit 10 to 3V-5V, for use. As such, even if the control unit 15 experiences a failure in a charging process, the charging voltage of one single cell will not exceed 5V, thereby improving safety of charging.

The first voltage feedback unit 161 and the second voltage feedback unit 162 may be two voltage feedback units that are physically separated and composed of different physical components. Alternatively, the first voltage feedback unit 161 and the second voltage feedback unit 162 may share some physical components. Exemplarily, the first voltage feedback unit 161 and the second voltage feedback unit 162 may share a common operational amplifier for voltage feedback, but may use different resistors to sample the output voltage of the power supply circuit 10.

The first voltage range may partly overlap with the second voltage range, or not overlap with the second voltage range.

The first voltage feedback unit 161 and the second voltage feedback unit 162 may be directly coupled with the modulating unit 12, or indirectly coupled with the modulating unit 12 through an optocoupler, which is not limited herein. If the first voltage feedback unit 161 and the second voltage feedback unit 162 are indirectly coupled with the modulating unit 12 through an optocoupler, the feedback signal sent by the first voltage feedback unit 161 and the second voltage feedback unit 162 to the modulating unit needs to undergo photoelectric transformation through the optocoupler first.

Figure 4:
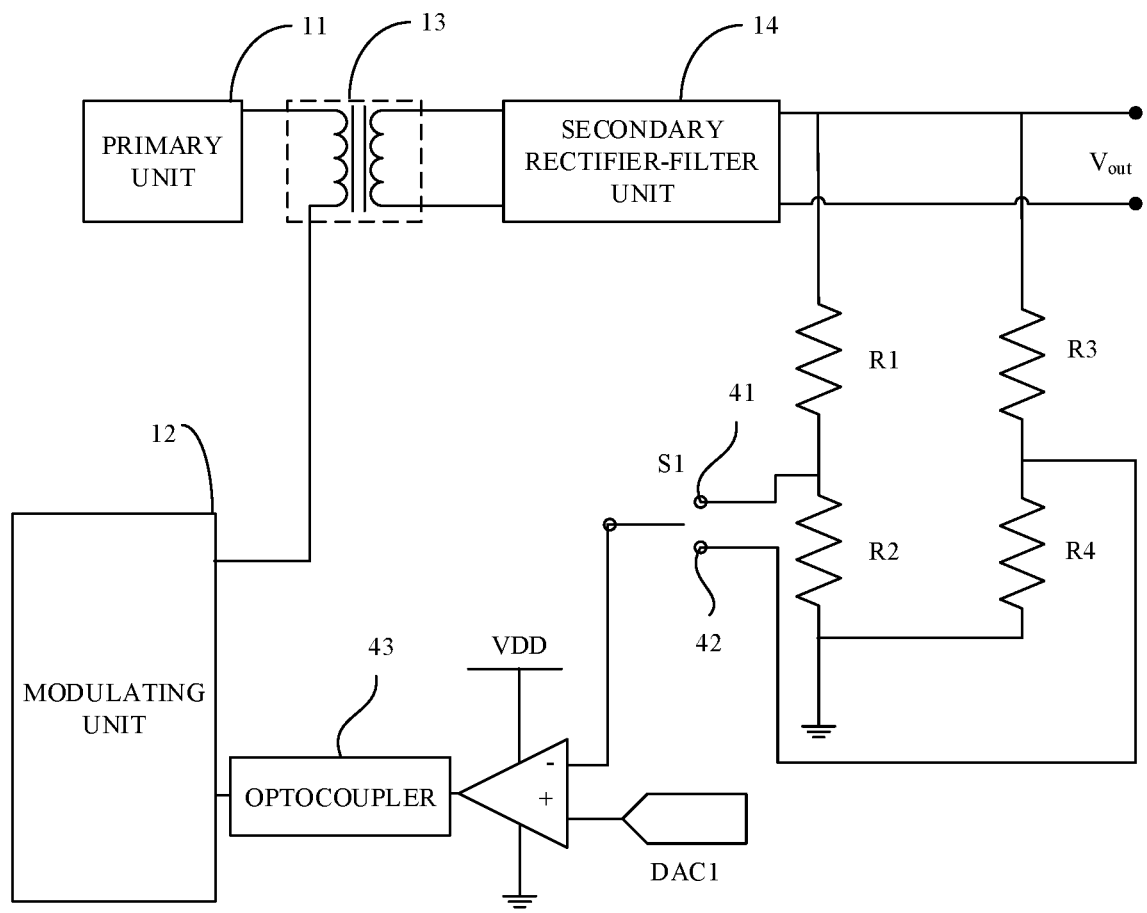
FIG. 4 is a schematic structural diagram illustrating a power supply circuit according to another implementation of the present disclosure.
Figure 5:
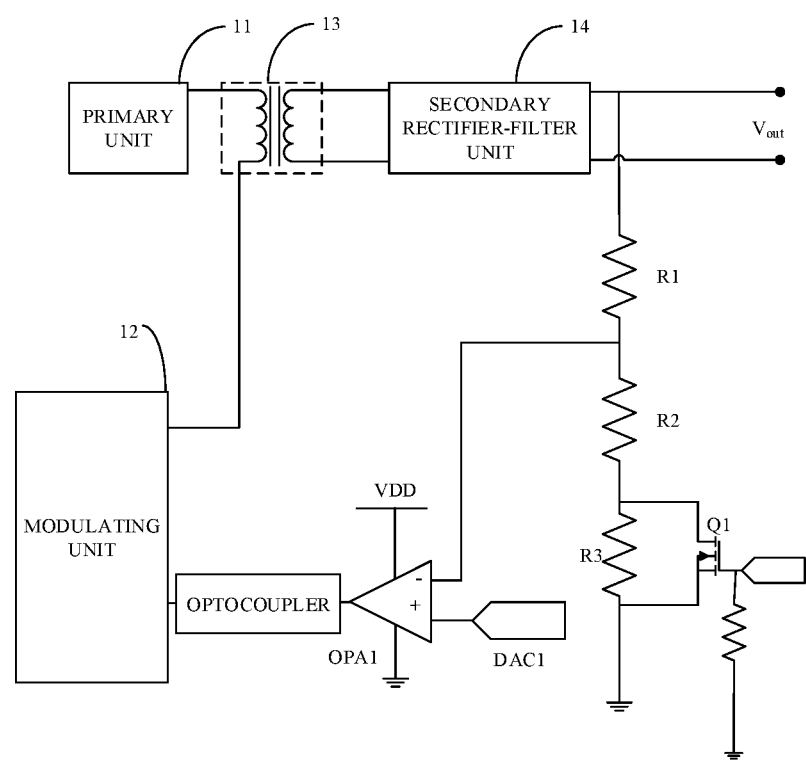
FIG. 5 is a schematic structural diagram illustrating a power supply circuit according to yet another implementation of the present disclosure.

The following will give two specific implementations of the first voltage feedback unit 161 and the second voltage feedback unit 162 in conjunction with FIG. 4 and FIG. 5.

In the implementation illustrated in FIG. 4, the first voltage feedback unit 161 can include a first voltage sampling unit composed of a first resistor R1 and a second resistor R2, and an operational amplifier OPA1 The first voltage sampling unit can be configured to sample the output voltage of the power supply circuit 10 based on the first resistor R1 and the second resistor R2 and take a voltage obtained after division of the second resistor R2 as a sampled voltage output by the first voltage sampling unit. As can be seen from FIG. 4, the first voltage sampling unit includes the first resistor R1 and the second resistor R2 which are coupled in series, the first resistor R1 has one end coupled to the output of the secondary rectifier-filter unit and the second resistor R2 has one end grounded.

In this implementation, the second voltage feedback unit 162 can include a second voltage sampling unit composed of a third resistor R3 and a fourth resistor R4, and the operational amplifier OPA1 (the first voltage feedback unit 161 and the second voltage feedback unit 162 share a common operational amplifier in the implementation of FIG. 4). The second voltage sampling unit can be configured to sample the output voltage of the power supply circuit 10 based on the third resistor R3 and the fourth resistor R4 and take a voltage obtained after division of the fourth resistor R4 as a sampled voltage output by the second voltage sampling unit. As can be seen from FIG. 4, the second voltage sampling unit includes the third resistor R3 and the fourth resistor R4 which are coupled in series, the third resistor R3 has one end coupled to the output of the secondary rectifier-filter unit and the fourth resistor R4 has one end grounded. The operational amplifier is coupled to the first voltage sampling unit and the second voltage sampling unit via the switch unit.

The switch unit 18 illustrated in FIG. 4 is a single-pole double-throw switch S1. When the first voltage feedback unit is currently in use for the power supply circuit 10, under the control of the control unit (not illustrated in FIG. 4), the switch S1 can be in contact with a contactor 41 to control the operational amplifier OPA1 to receive the sampled voltage output by the first voltage sampling unit. When the second voltage feedback unit is currently in use, under the control of the control unit, the switch S1 can be in contact with a contactor 42 to control the operational amplifier OPA1 to receive the sampled voltage output by the second voltage sampling unit.

In this implementation, an output end of the operational amplifier OPA1 is coupled with the modulating unit 12 through an optocoupler 43 and configured to send a feedback signal to the modulating unit 12.

In addition, in some implementations, a resistance of the first resistor R1, a resistance of the second resistor R2, a resistance of the third resistor R3, and a resistance of the fourth resistor R4 satisfy $R2/(R1+R2)=2R4/(R3+R4)$. The above manner in which the first resistor R1, the second resistor R2, the third resistor R3, and the fourth resistor R4 are configured can make the adjustable voltage range of the second voltage feedback unit 162 be twice the adjustable voltage range of the first voltage feedback unit 161. For example, when the adjustable voltage range of the first voltage feedback unit 161 is 3V-5V, the adjustable voltage range of the second voltage feedback unit 162 is 6V-10V. When the battery of the device to-be-charged includes one single cell, the first voltage feedback unit 161 can be selected for use, to limit the output voltage of the power supply circuit 10 to 3V-5V; when the battery of the device to-be-charged includes two cells coupled in series, the first voltage feedback unit 161 can be selected for use, to limit the output voltage of the power supply circuit 10 to 6V-10V.

In addition, a reference voltage input at a positive input end of the operational amplifier OPA1 can be constant. Alternatively, the positive input end of the operational amplifier OPA1 can be coupled with the control unit (not illustrated in FIG. 4) through a digital-to-analog converter DAC1 illustrated in FIG. 4, whereby the control unit adjusts the reference value of OPA1 by changing the numeric value of DAC1.

As illustrated in FIG. 5, the first voltage feedback unit 161 can include a first voltage sampling unit composed of a first resistor R1, a second resistor R2, and a third resistor R3, and an operational amplifier OPA1. The first voltage sampling unit can be configured to sample the output voltage of the power supply circuit 10 based on the first resistor R1, the second resistor R2, and the third resistor R3 and take a voltage obtained after division of both the second resistor R2 and the third resistor R3 as a sampled voltage output by the first voltage sampling unit.

The second voltage feedback unit 162 can include a second voltage sampling unit composed of the first resistor R1 and the second resistor R2, and the operational amplifier OPA1. The second voltage sampling unit can be configured to sample the output voltage of the power supply circuit 10 based on the first resistor R1 and the second resistor R2 and take a voltage obtained after division of the second resistor R2 as a sampled voltage output by the second voltage sampling unit.

As can be seen from FIG. 5, the first voltage sampling unit comprises the first resistor R1, the second resistor R2, and the third resistor R3 which are coupled in series sequentially. The first resistor R1 has one end coupled to the output of the secondary rectifier-filter unit and the third resistor R3 has one end grounded. The switch unit, that is, the MOS transistor Q1, is coupled in parallel with the third resistor R3, and the operational amplifier is coupled between the first resistor R1 and the second resistor R2.

The switch unit 18 illustrated in FIG. 5 is a MOS transistor Q1. When the first voltage feedback unit is currently in use for the power supply circuit 10, under the control of the control unit (not illustrated in FIG. 5), the MOS transistor Q1 is in an off-state, to make the operational amplifier OPA1 receive the sampled voltage output by the first voltage sampling unit. When the second voltage feedback unit 162 is currently in use for the power supply circuit 10, under the control of the control unit (not illustrated in FIG. 5), the MOS transistor Q1 is in an on-state, to make the operational amplifier OPA1 receive the sampled voltage output by the second voltage sampling unit.

In addition, in some implementations, a resistance of the first resistor R1, a resistance of the second resistor R2, and a resistance of the third resistor R3 satisfy $2R2/(R1+R2)=(R2+R3)/(R1+R2+R3)$. The above manner in which the first resistor R1, the second resistor R2, and the third resistor R3 are configured can make the adjustable voltage range of the second voltage feedback unit 162 be twice the adjustable voltage range of the first voltage feedback unit 161. For example, when the adjustable voltage range of the first voltage feedback unit 161 is 3V-5V, the adjustable voltage range of the second voltage feedback unit 162 is 6V-10V. When the battery of the device to-be-charged includes one single cell, the first voltage feedback unit 161 can be selected for use, to limit the output voltage of the power supply circuit 10 to 3V-5V; when the battery of the device to-be-charged includes two cells coupled in series, the first voltage feedback unit 161 can be selected for use, to limit the output voltage of the power supply circuit 10 to 6V-10V.

In addition, a reference voltage input at a positive input end of the operational amplifier OPA1 can be constant. Alternatively, the positive input end of the operational amplifier OPA1 can be coupled with the control unit (not illustrated in FIG. 5) through a digital-to-analog converter DAC1 illustrated in FIG. 5, whereby the control unit adjusts the reference value of OPA1 by changing the numeric value of DAC1.

As mentioned above, the primary unit can include a primary rectifier unit and a liquid electrolytic capacitor configured for primary filtering. The liquid electrolytic capacitor enables the output of the power supply circuit to be a constant DC voltage. However, the liquid electrolytic capacitor has a short service life and tends to explode, thereby causing a short service life of the power supply circuit and having risk. In addition, charging the battery of the device to-be-charged with the constant DC can result in polarization and lithium precipitation of the battery, thereby possibly decreasing the service life of the battery. In order to prolong the service life of the power supply circuit, improve safety of the power supply circuit, and reduce polarization and lithium precipitation of the battery during charging, a power supply circuit without a liquid electrolytic capacitor at the primary side is provided in an implementation of the disclosure.

Figure 6:
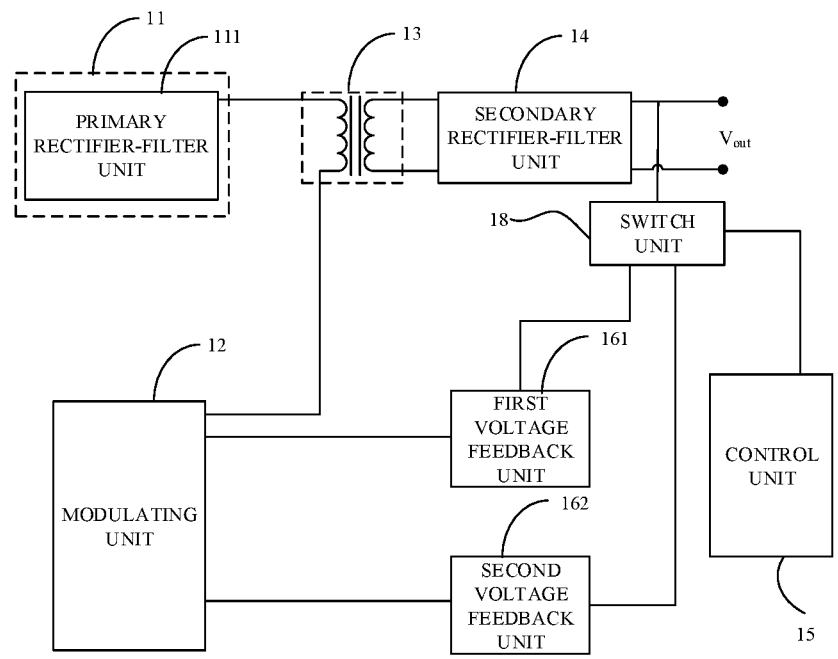
FIG. 6 is a schematic structural diagram illustrating a power supply circuit according to still another implementation of the present disclosure.
Figure 7:
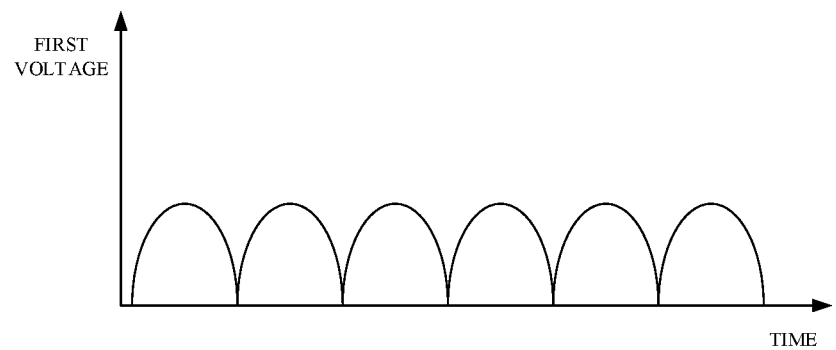
FIG. 7 is an exemplary diagram illustrating a waveform of a first voltage to-be-modulated obtained after removing a liquid electrolytic capacitor at the primary-side.

As illustrated in FIG. 6, the primary unit 11 can include a primary rectifier unit 111. In this implementation, the first voltage to-be-modulated described above is a voltage which is output by the primary rectifier unit 111 and has a magnitude varying periodically. The waveform of the first voltage can be a pulse wave (also known as steamed-bun wave), which is illustrated in FIG. 7.

Figure 8:
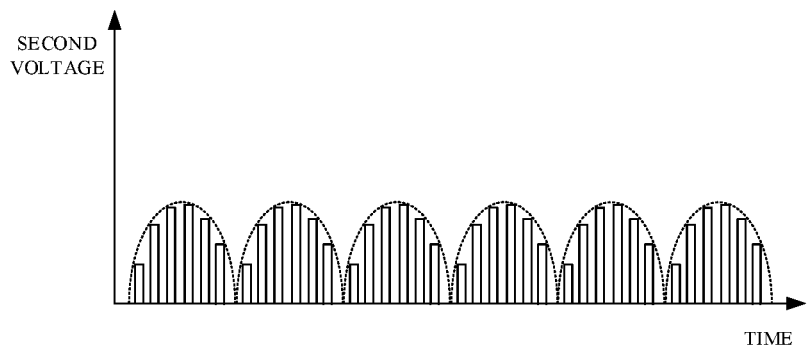
FIG. 8 is an exemplary diagram illustrating a waveform of a second voltage obtained after modulation of the first voltage illustrated in FIG. 7.

In the power supply circuit provided in this implementation, the liquid electrolytic capacitor configured for secondary filtering is removed, and the first voltage which is output by the primary rectifier unit and has a magnitude varying periodically is directly modulated. As to the waveform of the first voltage illustrated in FIG. 7, the waveform of the second voltage obtained after modulation is illustrated in FIG. 8. As illustrated in FIG. 8, the second voltage also includes multiple small pulse signals which have different magnitudes varying periodically. The dotted lines illustrated in FIG. 8 are envelopes which form the multiple pulse signals of the second voltage. Compared with FIG. 7, the envelopes which form the multiple pulse signals of the second voltage are similar to waveform of the first voltage.

It can be concluded from above that, in the power supply circuit 10 provided herein, the primary-side liquid electrolytic capacitor is removed, thereby reducing the volume of the power supply circuit, prolonging the service life of the power supply circuit, and improving safety of the power supply circuit.

Figure 9:
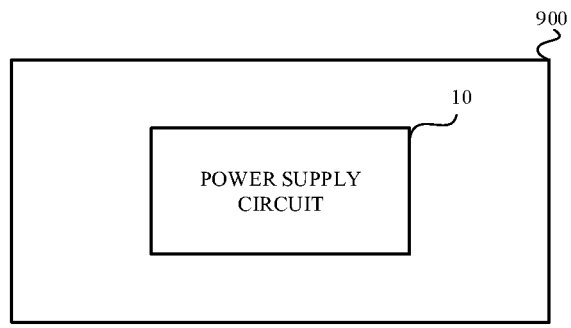
FIG. 9 is a schematic structural diagram illustrating a power supply apparatus according to an implementation of the present disclosure.

A power supply apparatus is also provided in an implementation of the disclosure. As illustrated in FIG. 9, the power supply apparatus 900 can include the power supply circuit 10 of any of the above implementations. The power supply apparatus 900 can be, for example, an adaptor, a power bank, or the like which is specially configured for charging, or other devices, such as a computer, configured for both power supply and data service.

The power supply circuit and the power supply apparatus provided herein have been detailed above in connection with FIG. 1A to FIG. 9. Hereinafter, a method for controlling a power supply circuit of implementations of the disclosure will be detailed. The power supply circuit can be the power supply circuit 10 of any of the above implementations. Description related to the power supply circuit can refer to the foregoing implementations, and repeated description is omitted herein.

The power supply circuit includes a primary unit, a modulating unit, a transformer, a secondary rectifier-filter unit, and a voltage feedback unit.

The primary unit is configured to generate a first voltage to-be-modulated according to AC input.

The modulating unit is configured to modulate the first voltage to generate a second voltage.

The transformer is configured to generate a third voltage according to the second voltage.

The secondary rectifier-filter unit is configured to generate an output voltage of the power supply circuit by rectifying and filtering the third voltage.

The voltage feedback unit is configured to receive the output voltage, and to send a feedback signal to the modulating unit when magnitude of the output voltage reaches a preset value.

The modulating unit is configured to modulate the first voltage to generate the second voltage according to the feedback signal, to limit the magnitude of the output voltage within a first voltage range or a second voltage range different from the first voltage range.

Figure 10:
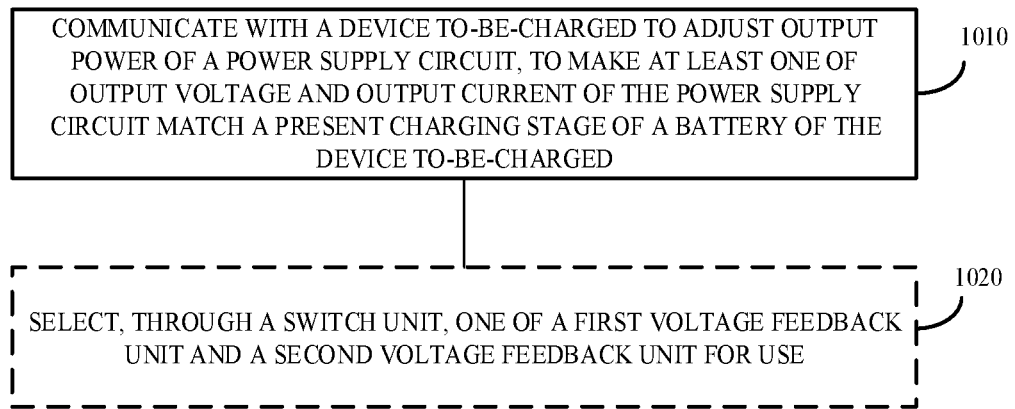
FIG. 10 is a schematic flowchart illustrating a control method according to an implementation of the present disclosure.

The method illustrated in FIG. 10 can include operations at block 1010.

At block 1010, communicate with a device to-be-charged to adjust output power of the power supply circuit, to make the output voltage and/or output current of the power supply circuit match a present charging stage of a battery of the device to-be-charged.

In some implementations, the voltage feedback unit includes a first voltage feedback unit and a second voltage feedback unit. The first voltage feedback unit is configured to limit the output voltage to the first voltage range together with the modulating unit. The second voltage feedback unit is configured to limit the output voltage to the second voltage range together with the modulating unit. The power supply circuit further includes a switch unit. The switch unit is for switching between the first voltage feedback unit and the second voltage feedback unit. The method illustrated in FIG. 10 can further include operations at block 1020. At block 1020, select, through the switch unit, one of the first voltage feedback unit and the second voltage feedback unit for use.

In some implementations, the first voltage feedback unit is configured to limit the magnitude of the output voltage between a third voltage magnitude and a first voltage magnitude, and the second voltage feedback unit is configured to limit the magnitude of the output voltage between a fourth voltage magnitude and a second voltage magnitude. The third voltage magnitude is smaller than the first voltage magnitude, the fourth voltage magnitude is smaller than the second voltage magnitude, and the first voltage magnitude is smaller than or equal to the second voltage magnitude.

In some implementations, the method illustrated in FIG. 10 can further include the following. Communicate with the device to-be-charged, to acquire the number of cells coupled in series in the device to-be-charged. Operations at block 1020 can include the following. Select, through the switch unit, one of the first voltage feedback unit and the second voltage feedback unit for use according to the number of cells coupled in series.

In some implementations, a charging stage of the battery includes at least one of a trickle charging stage, a constant-voltage charging stage, and a constant-current charging stage.

In some implementations, operations at block 1010 can include the following. In the constant-voltage charging stage, communicate with the device to-be-charged to adjust the output power of the power supply circuit, to make the output voltage of the power supply circuit match a charging voltage corresponding to the constant-voltage charging stage.

In some implementations, operations at block 1010 can include the following. In the constant-current charging stage, communicate with the device to-be-charged to adjust the output power of the power supply circuit, to make the output current of the power supply circuit match a charging current corresponding to the constant-current charging stage.

In some implementations, the primary unit includes a primary rectifier unit, and the first voltage to-be-modulated is a voltage which is output by the primary rectifier unit and has a magnitude varying periodically.

The above implementations may be wholly or partially implemented in software, hardware, firmware, or any combination thereof. When implemented in software, the implementations may wholly or partially take the form of computer program products. The computer program product includes one or more computer instructions. When the computer instructions are loaded and executed on a computer, procedures or functions of the implementations of the disclosure can be wholly or partially implemented. The computer may be a general-purpose computer, a dedicated computer, a computer network, or other programmable apparatuses. The computer instructions may be stored in a computer readable storage medium, or transmitted from one computer readable storage medium to another computer readable storage medium. For example, the computer instructions may be transmitted from one website, computer, server, or data center to another website, computer, server, or data center in a wired manner (such as a coaxial-cable, an optical fiber, a digital subscriber line (DSL)) or a wireless manner (such as infrared, wireless, microwave, or the like). The computer readable storage medium may be any usable medium accessible to the computer, or a storage device (such as a server, a date center, or the like) which includes one or more usable mediums integrated. The usable medium can be a magnetic medium (such as a floppy disk, a hard disk, or a magnetic tape), an optical medium (such as a digital video disc (DVD)), a semiconductor medium (such as a solid state disk (SSD)), or the like.

Those of ordinary skill in the art will appreciate that units (including sub-units) and algorithmic operations of various examples described in connection with implementations herein can be implemented by electronic hardware or by a combination of computer software and electronic hardware. Whether these functions are performed by means of hardware or software depends on the application and the design constraints of the associated technical solution. A professional technician may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units (including sub-units) is only a division of logical functions, and there may exist other ways of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A power supply circuit, comprising:
    a primary unit, configured to generate a first voltage to-be-modulated according to an alternating current (AC) voltage input;
    a modulating unit, configured to modulate the first voltage to generate a second voltage;
    a transformer, configured to generate a third voltage according to the second voltage;
    a secondary rectifier-filter unit, configured to generate an output voltage of the power supply circuit by rectifying and filtering the third voltage;
    a voltage feedback unit comprising a first voltage feedback unit and a second voltage feedback unit, the voltage feedback unit is configured to receive the output, voltage and to send a feedback signal to the modulating unit when magnitude of the output voltage reaches a preset value;
        wherein the first voltage feedback unit comprises a first voltage sampling unit and an operational amplifier, the first voltage sampling unit is configured to sample the output voltage based on a first resistor and a second resistor and take a voltage obtained after division of the second resistor as a sampled voltage output by the first voltage sampling unit;
        wherein the second voltage feedback unit comprises a second voltage sampling unit and the operational amplifier, the second voltage sampling unit is configured to sample the output voltage based on a third resistor and a fourth resistor and take a voltage obtained after division of the fourth resistor as a sampled voltage output by the second voltage sampling unit;
    a switch unit for switching between the first voltage feedback unit and the second voltage feedback unit;
    the modulating unit being configured to modulate the first voltage to generate the second voltage according to the feedback signal; and
    a control unit, configured to:
        communicate with a device to-be-charged to adjust output power of the power supply circuit, to make at least one of the output voltage and output current of the power supply circuit match a present charging stage of a battery of the device to-be-charged; and
        control, through the switch unit, the operational amplifier to receive the sampled voltage output by the first voltage sampling unit, when the first voltage feedback unit is currently in use, or control, through the switch unit, the operational amplifier to receive the sampled voltage output by the second voltage sampling unit, when the second voltage feedback unit is currently in use.

2. The power supply circuit of claim 1, wherein:
    the first voltage feedback unit is configured to limit the output voltage to a first voltage range together with the modulating unit;
    the second voltage feedback unit is configured to limit the output voltage to a second voltage range together with the modulating unit, the second voltage range being different from the first voltage range; and
    voltage feedback unit,
    the control unit is further configured to select, through the switch unit, one of the first voltage feedback unit and the second voltage feedback unit for use.

3. The power supply circuit of claim 2, wherein the first voltage range does not overlap with the second voltage range.

4. The power supply circuit of claim 1, wherein a resistance of the first resistor, a resistance of the second resistor, a resistance of the third resistor, and a resistance of the fourth resistor meet R2/(R1+R2)=2R4/(R3+R4), wherein R1 represents the resistance of the first resistor, R2 represents the resistance of the second resistor, R3 represents the resistance of the third resistor, and R4 represents the resistance of the fourth resistor.

5. The power supply circuit of claim 1, wherein the first voltage sampling unit comprises the first resistor and the second resistor which are coupled in series, the first resistor has one end coupled to the output of the secondary rectifier-filter unit and the second resistor has one end grounded; the second voltage sampling unit comprises the third resistor and the fourth resistor which are coupled in series, the third resistor has one end coupled to the output of the secondary rectifier-filter unit and the fourth resistor has one end grounded;
    and the operational amplifier is coupled to the first voltage sampling unit and the second voltage sampling unit via the switch unit.

6. The power supply circuit of claim 2, wherein the control unit is further configured to communicate with the device to-be-charged to acquire the number of cells coupled in series in the device to-be-charged, and to select, through the switch unit, one of the first voltage feedback unit and the second voltage feedback unit for use according to the number of cells coupled in series.

7. The power supply circuit of claim 1, wherein a charging stage of the battery comprises at least one of a trickle charging stage, a constant-voltage charging stage, and a constant-current charging stage.

8. The power supply circuit of claim 7, wherein the control unit configured to communicate with the device to-be-charged to adjust the output power of the power supply circuit, to make the at least one of the output voltage and the output current of the power supply circuit match the present charging stage of the battery of the device to-be-charged is configured to:
    when in the constant-voltage charging stage:
        communicate with the device to-be-charged to adjust the output power of the power supply circuit, to make the output voltage of the power supply circuit match a charging voltage corresponding to the constant-voltage charging stage.

9. The power supply circuit of claim 7, wherein the control unit configured to communicate with the device to-be-charged to adjust the output power of the power supply circuit, to make the at least one of the output voltage and the output current of the power supply circuit match the present charging stage of the battery of the device to-be-charged is configured to:

in the constant-current charging stage, communicate with the device to-be-charged to adjust the output power of the power supply circuit, to make the output current of the power supply circuit match a charging current corresponding to the constant-current charging stage.

10. The power supply circuit of claim 1, wherein the primary unit comprises a primary rectifier unit, and the first voltage to-be-modulated is a voltage which is output by the primary rectifier unit and has a magnitude varying periodically.

11. An adaptor, comprising:
a primary unit, configured to generate a first voltage to-be-modulated according to alternating current (AC) voltage input;
a modulating unit, configured to modulate the first voltage to generate a second voltage;
a transformer, configured to generate a third voltage according to the second voltage;
a secondary rectifier-filter unit, configured to generate an output voltage of a power supply circuit by rectifying and filtering the third voltage;
a voltage feedback unit, comprising:
a first voltage feedback unit, configured to limit the output voltage to a first voltage range together with the modulating unit, wherein the first voltage feedback unit comprises a first voltage sampling unit and an operational amplifier, and the first voltage sampling unit is configured to sample the output voltage based on a first resistor and a second resistor and take a voltage obtained after division of the second resistor as a sampled voltage output by the first voltage sampling unit;
a second voltage feedback unit, configured to limit the output voltage to a second voltage range together with the modulating unit, the second voltage range being different from the first voltage range, wherein the second voltage feedback unit comprises a second voltage sampling unit and the operational amplifier, and the second voltage sampling unit is configured to sample the output voltage based on a third resistor and a fourth resistor and take a voltage obtained after division of the fourth resistor as a sampled voltage output by the second voltage sampling unit;
a switch unit; and
a control unit, configured to:
select, through the switch unit, one of the first voltage feedback unit and the second voltage feedback unit for use according to a number of cells coupled in series in a device to-be-charged; and
control, through the switch unit, the operational amplifier to receive the sampled voltage output by the first voltage sampling unit, when the first voltage feedback unit is currently in use, or control, through the switch unit, the operational amplifier to receive the sampled voltage output by the second voltage sampling unit, when the second voltage feedback unit is currently in use.

12. The adaptor of claim 11, wherein
the voltage feedback unit is configured to receive the output voltage, and send a feedback signal to the modulating unit when magnitude of the output voltage reaches a preset value, and the modulating unit is configured to modulate the first voltage according to the feedback signal.

13. The adaptor of claim 11, wherein a resistance R1 of the first resistor, a resistance R2 of the second resistor, a resistance R3 of the third resistor, and a resistance R4 of the fourth resistor meet $R2/(R1+R2)=2R4/(R3+R4)$.

14. The adaptor of claim 11, wherein
the first voltage feedback unit comprises a first voltage sampling unit and an operational amplifier, and the first voltage sampling unit is configured to sample the output voltage based on a first resistor, a second resistor, and a third resistor and take a voltage obtained after division of both the second resistor and the third resistor as a sampled voltage output by the first voltage sampling unit;
the second voltage feedback unit comprises a second voltage sampling unit and the operational amplifier, and the second voltage sampling unit is configured to sample the output voltage based on the first resistor and the second resistor and take a voltage obtained after division of the second resistor as a sampled voltage output by the second voltage sampling unit; and
the control unit is configured to:
control, through the switch unit, the operational amplifier to receive the sampled voltage output by the first voltage sampling unit, when the first voltage feedback unit is currently in use; or
control, through the switch unit, the operational amplifier to receive the sampled voltage output by the second voltage sampling unit, when the second voltage feedback unit is currently in use.

15. The adaptor of claim 14, wherein the a resistance R1 of the first resistor, a resistance R2 of the second resistor, and a resistance R3 of the third resistor meet $2R2/(R1+R2)=(R2+R3)/(R1+R2+R3)$.

16. A power supply circuit, comprising:
a primary unit, configured to generate a first voltage to-be-modulated according to an alternating current (AC) voltage input;
a modulating unit, configured to modulate the first voltage to generate a second voltage;
a transformer, configured to generate a third voltage according to the second voltage;
a secondary rectifier-filter unit, configured to generate an output voltage of the power supply circuit by rectifying and filtering the third voltage;
a voltage feedback unit comprising a first voltage feedback unit and a second voltage feedback unit, configured to receive the output voltage, and to send a feedback signal to the modulating unit when magnitude of the output voltage reaches a preset value,
wherein the first voltage feedback unit comprises a first voltage sampling unit and an operational amplifier, and the first voltage sampling unit is configured to sample the output voltage based on a first resistor, a second resistor, and a third resistor and take a voltage obtained after division of both the second resistor and the third resistor as a sampled voltage output by the first voltage sampling unit; and
wherein the second voltage feedback unit comprises a second voltage sampling unit and the operational amplifier, and the second voltage sampling unit is configured to sample the output voltage based on the first resistor and the second resistor and take a voltage obtained after division of the second resistor as a sampled voltage output by the second voltage sampling unit;

a switch unit for switching between the first voltage feedback unit and the second voltage feedback unit, wherein the modulating unit is configured to modulate the first voltage to generate the second voltage according to the feedback signal; and a control unit, configured to:

communicate with a device to-be-charged to adjust output power of the power supply circuit, to make at least one of the output voltage and output current of the power supply circuit match a present charging stage of a battery of the device to-be-charged; and control, through the switch unit, the operational amplifier to receive the sampled voltage output by the first voltage sampling unit, when the first voltage feedback unit is currently in use, or control, through the switch unit, the operational amplifier to receive the sampled voltage output by the second voltage sampling unit, when the second voltage feedback unit is currently in use.

17. The power supply circuit of claim 16, wherein:

the first voltage feedback unit is configured to limit the output voltage to a first voltage range together with the modulating unit;

the second voltage feedback unit is configured to limit the output voltage to a second voltage range together with the modulating unit, the second voltage range being different from the first voltage range; and the control unit is further configured to select, through the switch unit, one of the first voltage feedback unit and the second voltage feedback unit for use.

18. The power supply circuit of claim 17, wherein the first voltage range does not overlap with the second voltage range.

19. The power supply circuit of claim 16, wherein a resistance of the first resistor, a resistance of the second resistor, and a resistance of the third resistor meet $2R2/(R1+R2)=(R2+R3)/(R1+R2+R3)$, wherein R1 represents the resistance of the first resistor, R2 represents the resistance of the second resistor, and R3 represents the resistance of the third resistor.

20. The power supply circuit of claim 16, wherein the first voltage sampling unit comprises the first resistor, the second resistor, and the third resistor which are coupled in series sequentially, and the first resistor has one end coupled to the output of the secondary rectifier-filter unit and the third resistor has one end grounded; and the switch unit is a MOS transistor coupled in parallel with the third resistor, and the operational amplifier is coupled between the first resistor and the second resistor.

* * * * *